(12) United States Patent
Eichberger et al.

(10) Patent No.: US 8,391,331 B2
(45) Date of Patent: Mar. 5, 2013

(54) METHOD OF CHARGING FINE-GRAINED METALS INTO AN ELECTRIC-ARC FURNACE

(75) Inventors: Heinz Eichberger, Bad Soden (DE); Karl-Josef Schneider, Schermbeck (DE)

(73) Assignees: Outotec Oyj, Espoo (FI); SMS Siemag AG, Duesseldorf (DE)

( * ) Notice: Subject to any disclaimer, the term of this patent is extended or adjusted under 35 U.S.C. 154(b) by 1730 days.

(21) Appl. No.: 10/566,033

(22) PCT Filed: Jul. 1, 2004

(86) PCT No.: PCT/EP2004/007153
§ 371 (c)(1), (2), (4) Date: Jul. 14, 2006

(87) PCT Pub. No.: WO2005/014868
PCT Pub. Date: Feb. 17, 2005

(65) Prior Publication Data
US 2007/0082312 A1 Apr. 12, 2007

(30) Foreign Application Priority Data
Jul. 23, 2003 (DE) .................................. 103 33 764

(51) Int. Cl.
*H05B 11/00* (2006.01)
(52) U.S. Cl. .................................. 373/72; 373/1; 373/85
(58) Field of Classification Search ..................... 373/72, 373/1, 8, 9, 85, 60, 79, 81; 266/200, 219, 266/89, 159
See application file for complete search history.

(56) References Cited

U.S. PATENT DOCUMENTS

| | | | | |
|---|---|---|---|---|
| 3,258,328 A | * | 6/1966 | Goss et al. | 75/253 |
| 3,379,426 A | * | 4/1968 | Werthmoller et. al. | 266/89 |
| 3,385,494 A | | 5/1968 | Themelis et al. | 75/10 |
| 3,634,592 A | | 1/1972 | Pantke et al. | 13/33 |

(Continued)

FOREIGN PATENT DOCUMENTS

| | | |
|---|---|---|
| CA | 2 388 582 | 3/2001 |
| CN | 1376208 A | 10/2002 |

(Continued)

OTHER PUBLICATIONS

Chinese Patent Office Notification of First Office Action in Chinese Application No. 200480021306 and English language translation thereof.

(Continued)

*Primary Examiner* — Quang Van
(74) *Attorney, Agent, or Firm* — Leydig, Voit & Mayer, Ltd.

(57) ABSTRACT

In a method of charging fine-grained metals, in particular directly reduced iron (DRI), into an electric-arc furnace (1), the metal is supplied via a downpipe (12) to an opening (10) provided in the furnace roof (4), is introduced into the furnace (1) through this opening (10) as bulk material stream (11), and falls onto the melt (13) merely by gravity. Further, an electric-arc furnace (1) suited for this purpose is described. A rather loss-free introduction even of fine-grained material having a mean grain size of less than 1 mm is achieved by passing the bulk material stream (11) through a dosing orifice (8) after the downpipe (12) and before entering the furnace (1). The bulk material stream (11) then enters the furnace essentially undisturbed.

26 Claims, 3 Drawing Sheets

U.S. PATENT DOCUMENTS

| | | | |
|---|---|---|---|
| 4,514,218 A | 4/1985 | Inagaki | 75/12 |
| 5,611,838 A | 3/1997 | Fritz et al. | 75/10.38 |
| 6,477,195 B2 | 11/2002 | Mittag et al. | 373/1 |
| 6,524,362 B1 | 2/2003 | Eichberger et al. | 75/10.46 |

FOREIGN PATENT DOCUMENTS

| | | |
|---|---|---|
| DE | 196 08 530 | 8/1997 |
| EP | 1 025 267 | 10/1998 |
| FR | 1 536 190 | 8/1968 |
| FR | 2 681 937 | 9/1991 |
| GB | 1 104 690 | 2/1968 |
| GB | 1 193 527 | 6/1970 |
| GB | 1 226 593 | 3/1971 |
| GB | 2 115 001 | 9/1983 |
| GB | 2115011 | 9/1983 |
| WO | WO 00/36161 | 6/2000 |

OTHER PUBLICATIONS

English language abstract of Chinese Patent No. 1376208A.

\* cited by examiner

METHOD OF CHARGING FINE-GRAINED METALS INTO AN ELECTRIC-ARC FURNACE

This application is the national phase application under 35 U.S.C. §371 of International Application No. PCT/EP2004/007153 filed on Jul. 1, 2004, entitled, "METHOD OF CHARGING FINE-GRAINED METALS INTO AN ELECTRIC-ARC FURNACE" which claims the benefit of German Patent Application No. 103 33 764. 4-24. filed on Jul. 23, 2003.

TECHNICAL FIELD

The present invention relates to a method of charging fine-grained metal, metal compounds or a mixture of two or more metals or metal compounds, in particular fine-grained directly reduced iron, into an electric-arc furnace, in which the metal, the metal compound or the mixture is supplied essentially continuously via at least one downpipe to one or more openings provided in the furnace roof, is introduced into the furnace through said at least one opening as a stream of bulk material, and falls onto the melt merely by gravity, as well as to an electric-arc furnace which is suited in particular for performing the above-mentioned method.

Electric-arc furnaces are used for melting metals, in particular during steel production for melting iron-containing solids, e.g. scrap or directly reduced iron. The energy required for melting is introduced by means of electric current via one or more electrodes, and the heat is transferred to the metallic charge via an electric arc. Expensive measures for processing the feedstock can be omitted. Therefore, the electric-arc furnace has developed into an economic assembly for producing high-grade steels and carbon steels in particular for mini steel mills with 1 to 1.5 million tons per year.

Lumpy melting stock (mainly scrap) is typically charged into the electric-arc furnace in batches via baskets. In the case of the continuous addition, charging the metals to be melted into the furnace is a critical aspect. In the case of lumpy feedstock it must be ensured that the metals to be introduced do not get in contact with the electrodes and damage the same when charging the furnace, and in the case of fine-grained feedstock it must be ensured that it is not entrained into the waste gas system by the gases ascending from the hot metal bath during operation of the furnace.

To provide for a continuous introduction of directly reduced iron into the iron bath free of losses, it is proposed in DE 196 08 530 A1 to introduce the directly reduced iron into the furnace during operation of the furnace through a lance extending through the furnace roof by using carbon dioxide as carrier gas and inject the same into the slag below the slag surface. However, providing and mixing the carrier gas with the directly reduced iron requires a considerable constructive effort. Moreover, the carrier gas injected into the furnace in a large amount together with the iron must again be discharged from the furnace, which has a negative influence on the energy balance.

From EP 1 025 267 B1 there is known a method of melting fine-grained directly reduced iron in an electric-arc furnace, in which the directly reduced iron is likewise introduced into the furnace through lances, but without carrier gas, the lance outlets being located above the iron bath in the layer of foamed slag. Thus, this method also makes use of constructively complex lances.

An alternative to the method based on the introduction through lances consists in charging directly reduced iron through openings provided in the furnace lid. The generic GB 1,104,690 describes a method of producing steel in an electric-arc furnace, in which during operation of the furnace sponge iron is continuously supplied through conduits to three openings in the furnace roof and from there falls onto the slag layer in a free fall. Supplying the sponge iron from a bunker to the openings is effected via a dosing device, in which the bulk material is distributed among three supply tubes, before it reaches the three openings via extension tubes and adjoining supplies. As compared to the method based on the introduction via lances, this method involves less constructive effort, but it is only suited for charging comparatively coarse-grained sponge iron, as fine-grained material, e.g. one with a grain size of less than 1 mm, is entrained by the gases ascending from the hot iron bath during the free fall through the furnace and is either deposited on the lower surface of the furnace roof or is discharged from the furnace by the waste gas, and thus leads to considerable yield losses.

DESCRIPTION OF THE INVENTION

Therefore, it is the object of the present invention to provide for charging fine-grained directly reduced iron (DRI) or the like in a constructively simple way, which ensures a rather loss-free introduction of the fine-grained material into the metal bath of the electric-arc furnace.

In accordance with the invention, this object is solved by the features of claim 1.

The present invention is based on the surprising finding for a person skilled in the art that, in case the stream of bulk material exits the downpipe undisturbed, even fine-grained metals with a mean grain size of less than 0.3 mm can be charged into the metal bath of the electric-arc furnace almost free of losses by a free fall. Undisturbed supply or delivery of bulk material in accordance with the present invention refers to a supply or delivery in which an enlargement of the stream of bulk material is reliably avoided by suitable measures, and thus the stream of bulk material always has a compact shape along the supply or delivery path. In accordance with the invention, the undisturbed supply of the stream of bulk material is achieved by a preferably round or oval dosing orifice without corners and sharp-edged transitions. Thereby it is ensured that a compact stream of bulk material exits the downpipe and an enlargement is reliably avoided. Dust losses can thereby be minimized. Experiments have shown that such a compact stream of bulk material not only is not enlarged, but is even constricted, its diameter is reduced and it remains compact due to the acceleration resulting from the free fall.

In principle, all orifices known to the skilled person can be used, as long as the orifice aperture has no corners and sharp-edged transitions. What is particularly preferred, however, are dosing orifices composed of several, preferably two individual orifices each with essentially circular or oval openings, in which the individual orifices are arranged to be movable with respect to each other. The through hole of the dosing orifice thus can be formed without corners and sharp-edged transitions in a constructively simple way and can be adjusted to any value between zero and the maximum opening of the individual orifices.

To avoid a falling curve of the stream of bulk material which leads to an enlargement of the stream of bulk material, the dosing orifice should be inclined by not more than 25° with respect to the horizontal plane. Particularly preferably, however, the dosing orifice is arranged horizontally, as in this way the stream of bulk material can pass through the openings of the dosing orifice without being deflected, i.e. without making a falling curve.

In accordance with a development of the invention it is proposed to keep the bulk material mass flow inside the downpipe at all points larger than the orifice throughput. What turned out to be particularly useful is to choose the diameter of the downpipe larger than the maximum diameter of the dosing orifice by the factor of 1 to 1.5, preferably by the factor of 1.2 to 1.5, and particularly preferably by the factor of 1.4 to 1.5.

For the purpose of reliably avoiding a significant enlargement of the material stream by gas turbulences when the stream of bulk material leaves the dosing orifice, the stream of bulk material is passed through a protective tube behind the dosing orifice. In terms of apparatus, this is achieved particularly easily in that the region of the furnace roof, at which the dosing orifice is arranged, constitutes an essentially cylindrical tube.

In accordance with a development of the invention, the protective tube is cooled for instance with water.

Contacts of the protective tube wall with the stream of bulk material would lead to a disintegration of the stream. In accordance with the invention, the diameter of the protective tube therefore is at least twice as large as the maximum opening diameter of the dosing orifice arranged between the downpipe and the protective tube. The dosing orifice preferably is arranged centrally inside the protective tube. In this way, contacts of the stream of bulk material with the walls of the protective tube can particularly reliably be prevented. If the dosing orifice is inclined with respect to the horizontal, the ratio of the diameters of the protective tube and the opening of the dosing orifice should be more than 4:1 and particularly preferably more than 5:1.

The method in accordance with the invention can be used for charging all metals, metal compounds or mixtures therefrom, in particular for charging directly reduced iron or ores, such as ilmenite or nickel ore. Preferably, the mean grain size of the fine-grained material is less than 1 mm, particularly preferably less than 0.5 mm, quite particularly preferably less than 0.4 mm and highly preferably less than 0.3 mm. Due to the undisturbed supply of the fine-grained material in the downpipe and the stream of bulk material falling onto the molten metal undisturbed, fine dust losses, for instance by small particles being entrained by the gases constantly ascending from the melt during operation of the furnace, are reliably avoided. The method in accordance with the invention thus ensures an almost loss-free charging of an electric-arc furnace with fine-grained material. The amount of fine-grained material in the total charge can be up to 100%.

The invention furthermore relates to a method of melting such fine-grained, directly reduced iron in an electric-arc furnace, in which the directly reduced iron is introduced into the electric-arc furnace by the charging method in accordance with the invention.

The present invention also relates to an electric-arc furnace which can be charged in accordance with the method described above and has a furnace roof with at least one charging hole, the charging hole being connected with a downpipe for supplying the metal, and a dosing orifice being provided at the outlet of the downpipe.

Preferably, the dosing orifice is an iris or consists of at least two round or oval slides movable with respect to each other.

Below the dosing orificeorifice a protective tube is provided in accordance with the invention, whose diameter should be at least twice as large as that of the downpipe. Particularly useful is a diameter ratio of (2 to 10):1, preferably (2 to 5):1, and particularly preferably (2.5 to 3.5):1. The length of the protective tube preferably is 1 to 3 times the maximum diameter of the stream of bulk material.

When charging the furnace with solid mixtures with large differences in grain size, the bulk recipient vessel constitutes a mass flow silo in accordance with the invention, in order to avoid a demixing of the bulk material and thus disturbances of the stream of bulk material.

The invention will subsequently be described in detail with reference to preferred embodiments and the drawing.

DETAILED DESCRIPTION OF THE PREFERRED EMBODIMENTS

Figure 1:
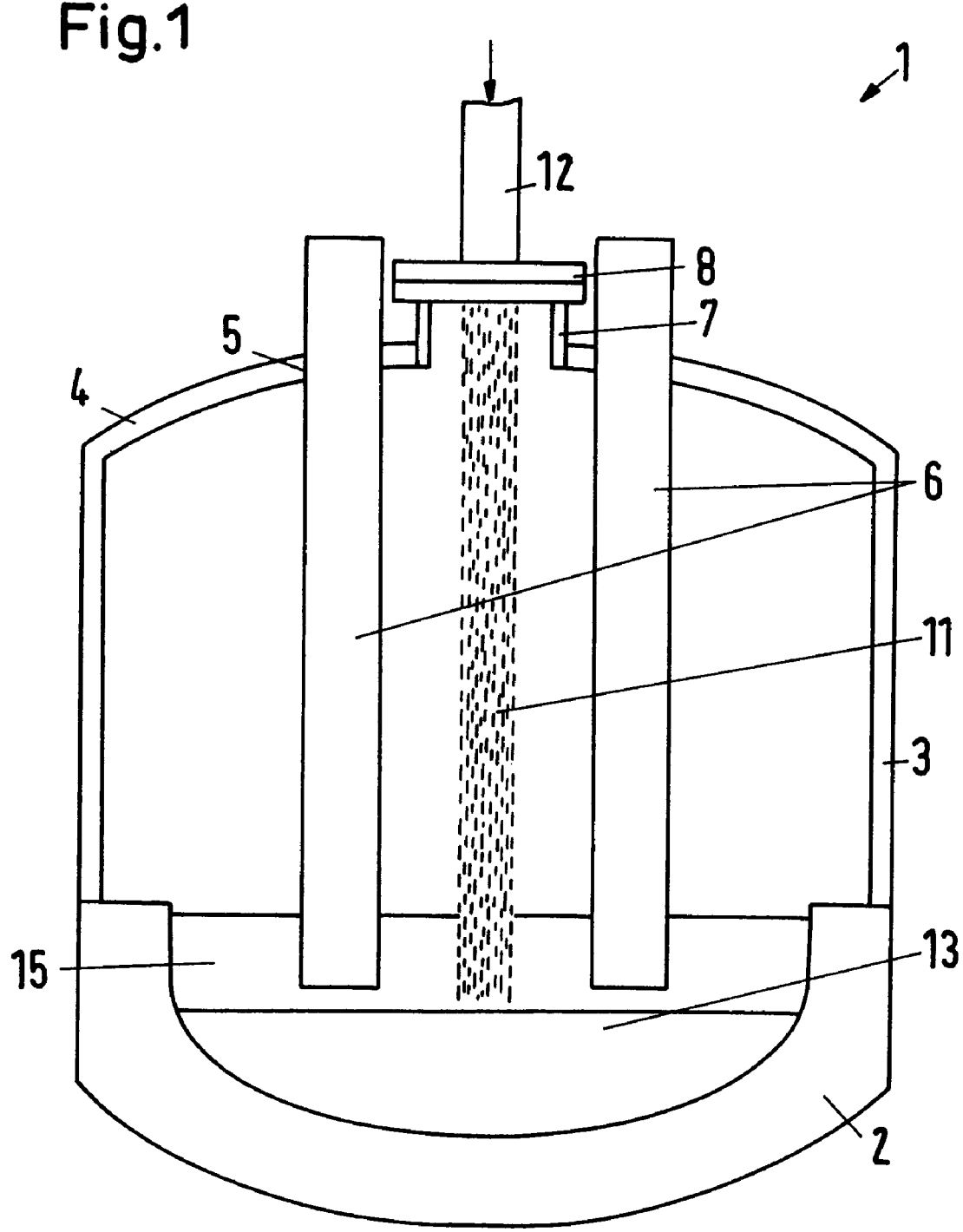
FIG. 1 shows a schematic vertical section of an electric-arc furnace in accordance with an embodiment of the present invention.

The electric-arc furnace 1 operated with alternating current, which is shown in FIG. 1, includes a brick-lined hearth 2, preferably water-cooled side walls 3 as well as a preferably water-cooled furnace roof 4. Three graphite electrodes 6, of which only two are shown in FIG. 1, extend through correspondingly dimensioned openings 5 into the interior of the furnace 1. The electric-arc furnace 1 can, however, also be equipped with more or less than three electrodes 6 and be operated with direct current.

In the vicinity of the longitudinal axis of the electric-arc furnace 1, a water-cooled vertical protective tube 7 is disposed at the furnace roof 4, at the upper end of which tube a horizontally arranged dosing orifice 8 is mounted. As can in particular be seen in FIG. 3, the dosing orifice 8 consists of two slides 9 which are movable with respect to each other and each have round or oval openings 10 of the same size, so that by moving the two orifices with respect to each other, the opening of the dosing orifice 8 can be adjusted to any value between zero and the maximum opening of the individual orifices.

Figure 4:
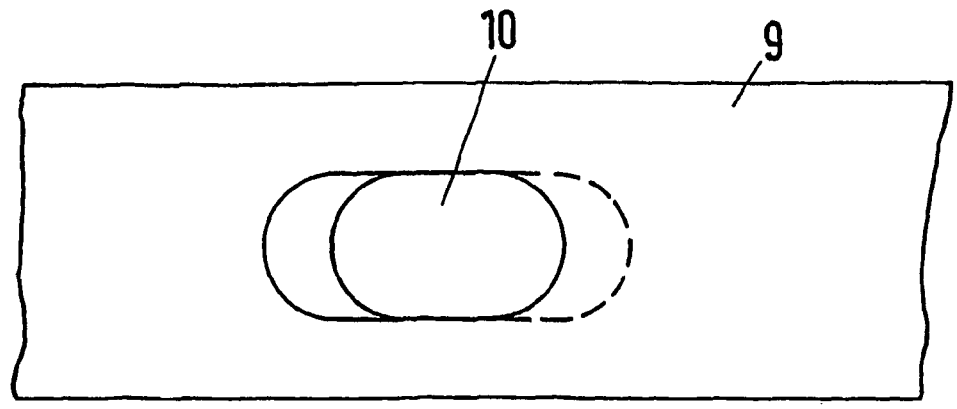
FIG. 4 shows a partial top view of a dosing orifice of the electric-arc furnace in accordance with FIG. 1.

Through the dosing orifice 8, a bulk material stream 11 enters the furnace. In the top view of the dosing orifice as shown in FIG. 4, the slides 9 each have oval openings.

Figure 3:
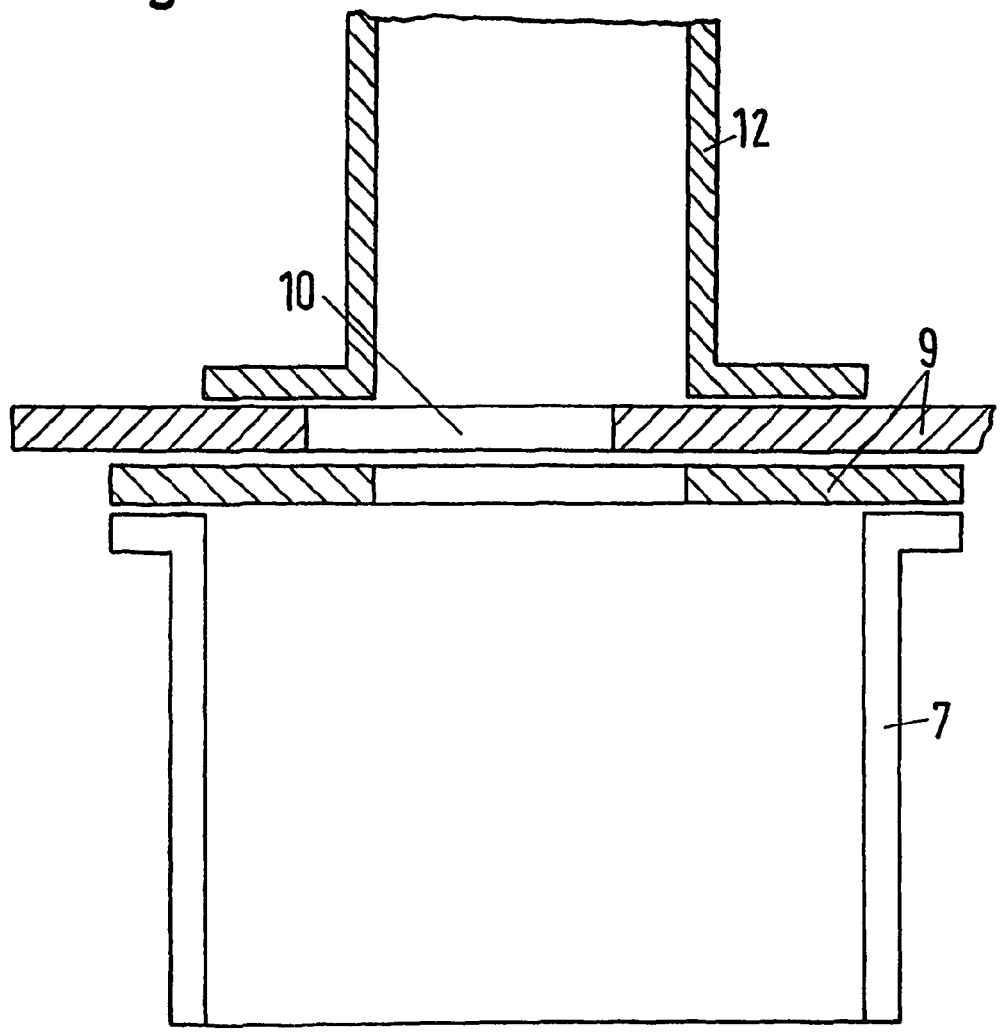
FIG. 3 shows a cutout of the roof opening region of the electric-arc furnace in accordance with FIG. 1.

The diameter of the protective tube is at least twice as large as the maximum opening diameter of the dosing orifice 8. As a result, contacts between the bulk material stream 11 and the protective tube wall are avoided, which would necessarily lead to a signcant disintegration of the bulk material stream 11. If the dosing orifice 8 is not arranged horizontally, as shown in FIGS. 1 and 3, but inclined with respect to the horizontal, the falling curve of the bulk material stream 11 should also be considered when choosing the ratio of protective tube diameter to opening diameter of the dosing orifice 8, so that said ratio should be chosen larger than 2.

Figure 2:
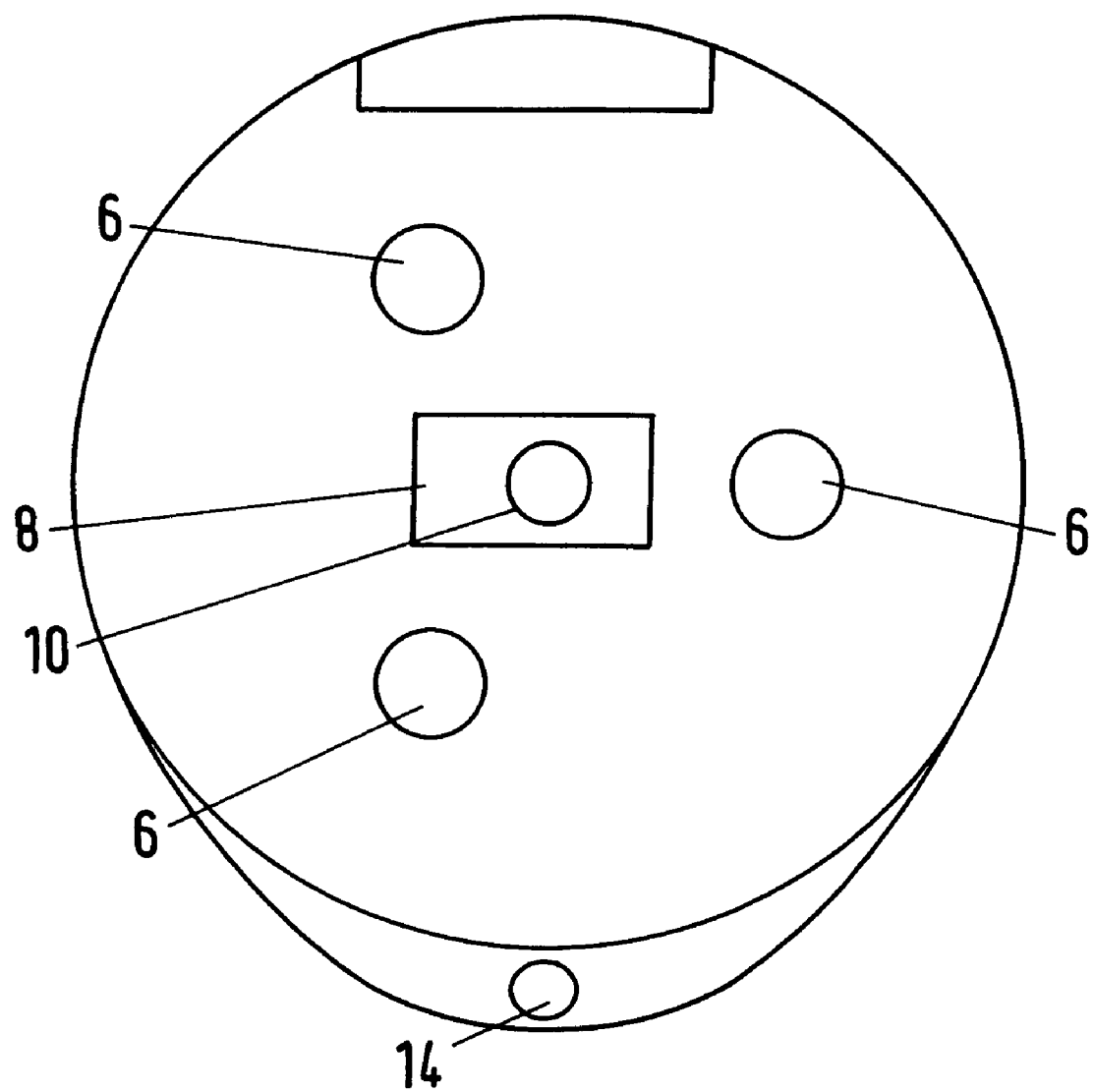
FIG. 2 shows a schematic top view of the electric-arc furnace in accordance with FIG. 1.

As can in particular be seen in FIG. 2, the three graphite electrodes 6 are arranged essentially symmetrically around the dosing orifice 8. When the furnace is only equipped with two electrodes, the stream of bulk material should likewise be arranged between the electrodes. But when the furnace has only one electrode, the stream of bulk material can be supplied at any point of the furnace in the vicinity of the electrode.

The dosing orifice 8 is connected with a cylindrical downpipe 12 for supplying metal, e.g. directly reduced iron (DRI), to be charged into the electric-arc furnace 1. To obtain an undisturbed bulk material stream 11, the downpipe should always be completely filled. This can be achieved in that the possible bulk material mass flow through the down pipe 12 is larger than the orifice throughput at all points before the dosing orifice 8, i.e. the inside diameter of the downpipe 12 should at least be as large as the maximum opening diameter of the dosing orifice 8. Possibly, the latter can slightly be throttled during operation.

The downpipe 12 has no fittings effecting a disintegration of the stream of bulk material and to be positioned in intermediate positions, such as butterfly valves, ball valves or the like, in order to ensure an undisturbed bulk material stream 11 during operation of the electric-arc furnace 1.

When using such electric-arc furnace 1 for steel production, liquid steel from the preceding operating charge is retained in the furnace as liquid heel to facilitate the charging and melting of directly reduced iron. By injectng coke breeze or petroleum coke into the melt, a foamed slag is produced during the further operation of the furnace with continuous charging of directly reduced iron. The hot directly reduced iron is continously supplied to the electric-arc furnace 1 via the downpipe 12 and the dosing orifice 8 and merely by gravity falls onto the bath in an undisturbed compact bulk material stream 11 between the electrodes 6 and penetrates into the steel melt 13. Due to the undisturbed bulk material stream 11, particularly fine-grained directly reduced iron, for instance one with a mean grain size of less than 1 mm or even less than 0.3 mm, can be used in the method of the invention. Preferably, the ratio of bulk material to power supply rate is controlled in such a way that the directly reduced iron is molten continuously and the temperature of the steel bath remains constant or slightly rises to tapping temperature.

At the end of the heat, the steel melt 13 is withdrawn from the furnace via the tap hole 14, and to facilitate the charging and melting of DRI in the next heat, part of the melt 13 remains in the electric-arc furnace 1 as liquid heel. After an extended downtime, before the furnace must be emptied completely, the liquid heel is produced by melting steel or iron scrap.

EXAMPLE

For producing steel from fine-grained highly metallized directly reduced iron (DRI), there was used a tiltable electric-arc furnace 1 operated with three-phase alternating current as shown in FIG. 1, which had a capacity of 150 t liquid steel and was supplied with power via a 100 MVA transformer.

Upon tapping the preceding heat, 30 t of liquid heel remained in the furnace. Before starting the charging of DRI for the next heat, the electrodes were positioned, the power supply was switched on, and then hot DRI was charged through the central downpipe 12 arranged in the middle of the furnace in an undisturbed stream of bulk material in a free fall between the three electrodes.

The DRI charged had a mean grain size of 0.3 mm and originated from a fine ore direct reduction plant, wherein the material temperature was about 650° C. Beside metallic iron, the DRI also contained 8.5 wt-% FeO, 1.1 wt-% $SiO_2$, 1.1 wt-% $Al_2O_3$, 0.9 wt-% MnO and 1 wt-% C.

Via the dosing orifice 8, the supply rate of the directly reduced iron was adjusted to 3 t/min. The downpipe 12 had an inside diameter of 200 mm. The dosing orifice, whose maximum opening diameter corresponded to the downpipe diameter, was slightly throttled tied, so that an oval opening with a maximum diameter of about 180 mm was obtained. Below the dosing orifice 8, there was provided the water-cooled protective tube 7 with an inside diameter of about 400 mm, which ended in the furnace roof 4.

During the experiment, the ratio of bulk material to power supply rate was controlled such that the directly reduced iron was molten continuously and the temperature of the steel bath remained constant or slightly rose to tapping temperature. By injecting oxygen and carbon during the entire test period, the formation of the foamed slag layer on the iron bath was promoted. Furthermore, lime was supplied to the electric furnace, in order to adjust the desired basicity in the furnace.

Upon reaching the desired tapping temperature of about 1630° C., 120 t of steel melt with a carbon content of 0.1% were tapped. Upon tapping, 30 t of steel were left in the furnace as liquid heel for the next heat.

LIST OF REFERENCE NUMERALS

1 electric-arc furnace
2 brick-lined hearth
3 side wall
4 furnace roof
5 opening
6 electrode
7 protective tube
8 dosing orifice
9 slide
10 opening
11 bulk material stream
12 downpipe
13 molten metal
14 tap hole
15 foamed slag

The invention claimed is:

1. A method of charging a bulk material including fine-grained metal, metal compounds or a mixture of two or more metals or metal compounds, into an electric-arc furnace, in which the bulk material is supplied essentially continuously via at least one downpipe to one or more openings provided in the furnace roof, is introduced into the furnace through said at least one opening as a bulk material stream, and falls onto the melt merely by gravity, wherein before entering the furnace after the downpipe the bulk material stream is passed through a dosing orifice to control a material flow rate so as to maintain at least a portion of the downpipe filled with the bulk material so that the bulk material stream enters the furnace essentially undisturbed, so that the bulk material stream is not substantially enlarged during the fall onto the melt.

2. The method as claimed in claim 1, wherein after the downpipe the bulk material stream is passed through a round or oval dosing orifice.

3. The method as claimed in claim 1, wherein after the downpipe the bulk material stream is passed through an iris.

4. The method as claimed in claim 1, wherein the dosing orifice is inclined by not more than 25° with respect to the horizontal.

5. The method as claimed in claim 1, wherein the dosing orifice is arranged horizontally.

6. The method as claimed in claim 1, wherein the mass flow of the bulk material stream in the downpipe is kept larger than the throughput through the dosing orifice.

7. The method as claimed in claim 1, wherein after the dosing orifice the bulk material stream is passed through a protective tube.

8. The method as claimed in claim 7, wherein the protective tube is cooled.

9. The method as claimed in claim 1, wherein the metal, metal compound or mixture of two or more metals or metal compounds introduced into the furnace has a mean grain size of less than 1 mm.

10. An electric-arc furnace for charging with fine-grained directly reduced iron or ores, comprising a furnace roof having at least one opening, the at least one opening of the furnace roof being connected with a downpipe leading to the furnace lid from outside for supplying the material to be charged, wherein at an opening of the downpipe into the furnace an adjustable dosing orifice is configured to control a flow of the material into the furnace is provided.

11. The electric-arc furnace as claimed in claim 10, wherein the dosing orifice is an iris.

12. The electric-arc furnace as claimed in claim 10, wherein the dosing orifice has at least two slides movable with respect to each other.

13. The electric-arc furnace as claimed in claim 10, wherein the dosing orifice is inclined with respect to the horizontal by not more than 25°.

14. The electric-arc furnace as claimed in claim 10, wherein the dosing orifice is arranged horizontally.

15. The electric-arc furnace as claimed in claim 10, wherein the bulk recipient vessel constitutes a mass flow silo.

16. The electric-arc furnace as claimed in claim 10, wherein the downpipe is arranged vertically.

17. The electric-arc furnace as claimed in claim 10, wherein below the dosing orifice a preferably vertical protective tube is provided.

18. The electric-arc furnace as claimed in claim 17, wherein the length of the protective tube is about 1 to 3 times the maximum diameter of the stream of bulk material.

19. The electric-arc furnace as claimed in claim 17 wherein the protective tube is cooled.

20. The electric-arc furnace as claimed in claim 17, wherein the diameter of the protective tube is at least twice as large as the opening diameter of the dosing orifice.

21. The electric-arc furnace as claimed in claim 10, wherein the maximum opening diameter of the dosing orifice is smaller than or equal to the diameter of the downpipe.

22. A method of charging a bulk material including fine-grained metal, metal compounds or a mixture of two or more metals or metal compounds, into an electric-arc furnace, in which the bulk material is supplied essentially continuously via at least one downpipe to one or more openings provided in the furnace roof, is introduced into the furnace through said at least one opening as a bulk material stream, and falls onto the melt merely by gravity, wherein before entering the furnace after the downpipe the bulk material stream is passed through an adjustable dosing orifice to control a material flow rate so as to maintain at least a portion of the downpipe filled with the bulk material so that the bulk material stream enters the furnace essentially undisturbed, so that the bulk material stream is not substantially enlarged during the fall onto the melt.

23. The method as recited in claim 22, wherein the adjustable dosing orifice is round or oval.

24. The method as claimed in claim 22, wherein the adjustable dosing orifice is an iris.

25. The method as claimed in claim 22, wherein the adjustable dosing orifice is inclined by not more than 25° with respect to the horizontal.

26. The method as claimed in claim 22, wherein the adjustable dosing orifice is arranged horizontally.

* * * * *